United States Patent [19]
Gross

[11] Patent Number: 4,950,019
[45] Date of Patent: Aug. 21, 1990

[54] MOLDING CONSTRUCTION
[75] Inventor: Michael G. Gross, Tipp City, Ohio
[73] Assignee: Creative Extruded Products, Inc., Tipp City, Ohio
[21] Appl. No.: 426,966
[22] Filed: Oct. 26, 1989
[51] Int. Cl.⁵ .............................................. B60R 13/06
[52] U.S. Cl. ........................................ 296/93; 296/201; 52/208
[58] Field of Search ........................... 296/93, 84, 201; 52/208, 397, 400

[56] References Cited
U.S. PATENT DOCUMENTS
4,840,001 6/1989 Kimisawa ............................... 296/93

FOREIGN PATENT DOCUMENTS
0249560 6/1987 European Pat. Off.
3612923 10/1987 Fed. Rep. of Germany.
2565621 12/1985 France.
2582714 12/1986 France.

Primary Examiner—Robert R. Song
Attorney, Agent, or Firm—Reuben Wolk

[57] ABSTRACT

A molding construction for concealing the edge of a window of an automobile and the adjacent body structure and the space between, comprising outer and inner members. The outer member is made of a polymeric material, and the inner member is made of a softer polymeric material. The inner member is snapped around the edge of the window, and the outer member, which has a smooth continuous surface, is inserted into a portion of the inner member and provides an improved decorative effect. The outer member may be easily inserted or removed for touch-up or repair of the concealed portions.

12 Claims, 1 Drawing Sheet

MOLDING CONSTRUCTION

BACKGROUND OF THE INVENTION

The present invention relates to a molding construction for motor vehicle bodies, particularly to the application of such a construction to a fixed window, such as the windshield, which is part of the vehicle. The molding construction is used to retain the window to the body, and also to conceal the space between the window and the adjacent body panel.

The fixed windows ae installed on the body in such a manner that the above-referred to space exists, and this space must must be concealed in order to improve the appearance of the exterior of the vehicle, and to reduce noise to the interior. Conventionally, this is accomplished by pressing a molding into the space and bonding to the body and the window.

PRIOR ART STATEMENT

With the conventional molding referred to above, various problems may arise. Unequal spacing between the glass and the adjacent body panel may cause unsightly differences in the manner in which the molding is applied. The principal problems arise, however, when repairs are required to the window, or when the body adjacent to the window requires touching up. In such instances, the molding must be removed entirely for certain types of repair, or masked off for repainting the body. In the latter case, the molding may be distorted when subjected to painting oven temperatures.

One attempt to improve over conventional moldings is described in European Patent Application No. 249,560, wherein the inventor has glued a surround member to the end of the glass, in wich the outer surface of the surround member which covers the outer edge is made of a different material than the body. A separate outer member is inserted into the surround member, and conceals the space between the glass end and the body panel. The edge of this outer member abuts the shoulder of the outer surface of the surround member and forms a fairly continuous surface, although a definite line of demarcation still exists.

SUMMARY OF THE INVENTION

The present invention represents an important improvement over the prior art devices by providing a molding construction comprising an outer portion which may be easily removed prior to retouching or repainting the body, or repairing the edge of the glass, then re-attached.

This is accomplished by providing a construction having an inner member of a polymeric material which grips and surrounds the edge of the window, and has a recess extending at right angles to the windows. An outer member of a softer polymeric material has an inwardly extending tongue of a harder material which is inserted into the recess and locks it into place without the need for glueing it to the inner member, the window or the body. Because of this type of interengagement between the inner and outer bodies, the outer member may easily be removed for the above-mentioned repair or repainting, and just as easily inserted. The interengagement is preferably accomplished by correlating the shape of a tongue on the outer member and a recess on the inner member which is sufficiently resilient to form a locking arrangement. When the outer member is thus inserted, it provides concealment for the inner member, the edge of the window, the body panel flange, and the space between the window and flange. The outer surface of the outer member is smooth and continuous, and this provides a more pleasing effect than is possible, for example, in the European Patent Application referred to above. The outer member will retain its structural and color integrity because it need not be exposed to paint ovens.

Accordingly, it is a principal object of the invention to provide a molding construction for concealing the space between a window and an adjacent body panel flange which simplifies any repair or repaint procedures to the areas being concealed by the molding construction.

It is further object to permit retention of the integrity of the molding construction.

It is another object to provide a smooth, continuous exterior molding surface.

It is yet another object to provide a molding construction wherein an outer member may be quickly and easily inserted in and removed from an inner member without damage to either member, or to the body or the window.

Other details, features, and objects of the invention will become apparent from the embodiment presented in the following description of the drawings.

DESCRIPTION OF THE DRAWINGS

The accompanying drawing illustrates the preferred embodiment of the invention, in which.

DESCRIPTION OF THE PREFERRED EMBODIMENT

Figure 1:
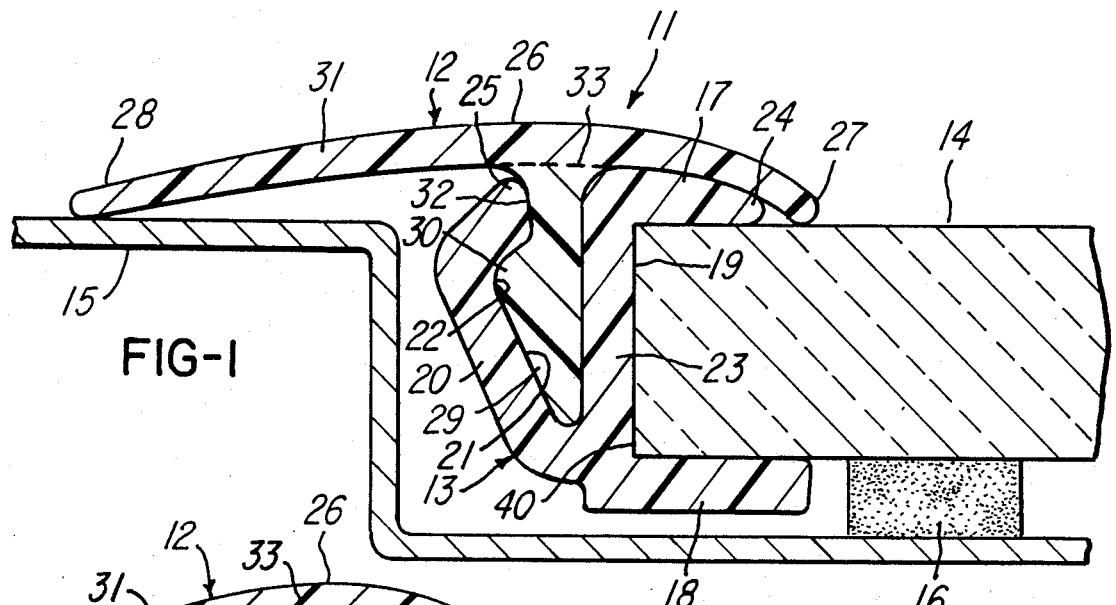
FIG. 1 is a sectional view of the novel molding construction, shown assembled to the window and body panel flange.
Figure 2:
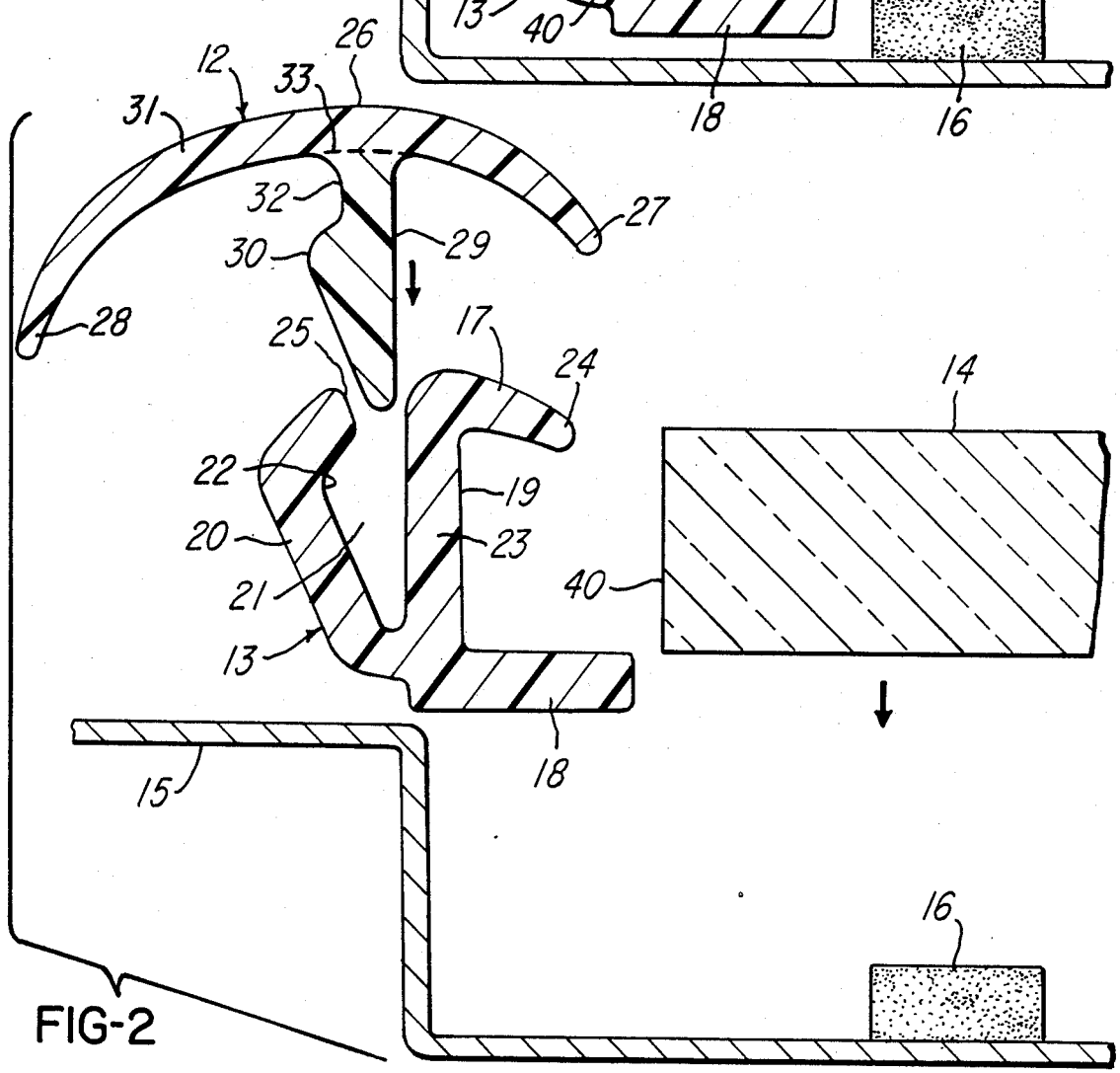
FIG. 2 is an exploded sectional view of the novel construction with the parts not assembled.

Referring now to the drawings, the novel molding construction is shown in assembled position in FIG. 1, and the outer member is shown removed from the inner member in FIG. 2.

The molding construction is generally designated by reference number 11, and consists of an outer member 12 and an inner member 13 which is used in association with a window 14 attached to a body panel flange 15 of the vehicle by means of adhesive 16. The members 12 and 13 are made of suitable elastomeric material which is well-known in the art, such as polyvinyl chloride, with the principal portion of the outer member 12 being somewhat softer than the inner member.

As best shown in FIG. 2, the inner member 13 is formed of a vertical leg 23, and has an upper leg 17 and a lower leg 18 each extending approximately at right angles to the body. The tip 24 of the upper leg is directed toward the lower leg to form a natural clamping effect, as will be described later. Extending outward at an angle from body 23 is another leg 20, having a tip 25 and an indented portion 22. The leg, tip and indented portion form a recess 21. The inner member has a hardness of about 55 Shore D, and is preferably formed by extrusion. The outer member 12 is formed by co-extruding a principal body 31 and a tongue 29 so that they become unitary after extrusion to form the member 12. The juncture of the body and the tongue is shown in dash lines designated by reference number 33. The body 31 is softer than member 13, having a hardness of about 85 Shore A, while the tongue 29 has approximately the same hardness as member 13 (about 55 Shore D). Outer surface 26 of the body 31 is smooth and continuous. The body member has ends 27 and 28. The tongue 29 has a projection 30 at right angles thereto, forming a recess 32.

When the assembly is initially made, the inner member 13 is clamped on the window, inserting the edge 40 of the window into the channel 19. The clamping effect is enhanced by the resilience of the member, and the tendency of the tip 24 of the upper leg to be directed toward the lower leg. Although not required, an adhesive may be applied to the channel 19 to improve adhesion to the member. The outer member 12 is then installed into the inner member by inserting the tongue 29 into the recess 21, and is locked in place by inserting the projection 30 into indented portion 22 and the resilient action of leg 20 and tip 25 into the recess 32.

The outer surface of the assembly is thus smooth and continous, and conceals the body panel flange, the edge of the window, and the inner member, and is pleasing to the eye as well as providing the necessary sealing effect. The outer member is also of sufficient dimension to provide for any misalignment of the resulting adjacent parts of the vehicle.

The resulting assembly is thus accomplished without the need for adhesives, and thus permits simple removal of the outer member for the above-mentioned purposes of touching up or repainting the body panel or edge of the window which is concealed, and then reinstalling the outer member. It is noted that the configuration of the body 31 of the outer member 12 has been changed from its unassembled state of FIG. 1 to its assembled state of FIG. 2, which is desirable because the pressure of ends 27 and 28 against body panel flange 15 and window 14 tends to flatten the body out, and thus create a tighter seal against those areas. The slightly softer composition of member 12 improves this relationship.

It should be understood that the specific construction of the members 12 and 13 are merely exemplary, and that other modifications may be made within the spirit of the invention. For example, the specific shapes of the interlocking tongue and groove may be modified to accomplish the same result.

I claim:

1. In a motor vehicle body having a body panel flange and an adjacent window, a molding construction concealing the space between said body panel flange and an edge of said window; the improvement wherein said construction comprises separate inner and outer members which are free of permanent attachment to each other, said inner member retaining said window edge, and said outer member mounted on said inner member but capable of repeated removal therefrom and reattachment thereto, said inner and outer members each having mutually interengaging means for mounting said outer member on said inner member, said outer member also comprising an elongated outer body, said interengaging means of said outer member being formed as part of said outer member but being harder than said outer body of said outer member and having approximately the same hardness as said inner member, said outer body having one end contacting said body panel flange and the other end contacting said window edge, said outer body having the same hardness throughout.

2. The construction of claim 1 wherein said interengaging means comprise an outwardly extending recess in said inner member and an inwardly extending resilient means on said outer member inserted into said recess.

3. The construction of claim 1 wherein said outer body of said outer member comprises a unitary monolithic body with a smooth continuous outer surface free of any line of demarcation.

4. The construction of claim 1 wherein said inner and outer members are flexible and resilient and are composed of polymeric materials.

5. In a motor vehicle body having a body panel flange and an adjacent window, a method of concealing the space between said flange and an edge of said window by securing said window edge with a first member and concealing said flange, said window edge, said space, and said first member with a second member; the improvement comprising the steps of forming a first engaging means as part of said first member, forming said second member in a unitary monolithic body comprising an outer body and a second engaging means, forming said second engaging means harder than said outer body but approximately as hard as said first member and providing said outer body with a smooth continuous outer surface free of any line of demarcation, interengaging said first and second members, and maintaining said first and second members free of permanent attachment therebetween.

6. The method of claim 5 wherein said step of forming said second member comprises the step of co-extruding said second engaging means with said outer body.

7. The construction of claim 1 wherein said interengaging means of said outer member is a co-extrusion with said outer body.

8. The construction of claim 1 wherein said outer body of said outer member has a first configuration in an unassembled state but has a different configuration in an assembled state to create a tighter seal against said body panel flange and said window.

9. The construction of claim 8 wherein said first configuration is generally concave in a direction toward said first member.

10. The construction of claim 8 wherein said different configuration is flatter that said first configuration.

11. The construction of claim 2 wherein interengagement of said interengaging means is provided by correlating the shape of said inwardly extending resilient means with said recess.

12. The construction of claim 1 wherein said inner member and said interengaging means of said outer member have a hardness of approximately 55 Shore D, and said outer body of said outer member has a hardness of approximately 85 Shore A.

* * * * *